(12) United States Patent
Rippl et al.

(10) Patent No.: US 7,696,452 B2
(45) Date of Patent: Apr. 13, 2010

(54) PROCESS FOR THE LASER BEAM MACHINING, ESPECIALLY LASER BEAM WELDING, OF COMPONENTS

(75) Inventors: Peter Rippl, Augsburg (DE); Anton Englhard, Petersdorf/Schönleiten (DE); Martin Eberl, Bernried (DE)

(73) Assignee: KUKA Systems GmbH, Augsburg (DE)

( * ) Notice: Subject to any disclaimer, the term of this patent is extended or adjusted under 35 U.S.C. 154(b) by 737 days.

(21) Appl. No.: 10/595,205

(22) PCT Filed: Sep. 22, 2004

(86) PCT No.: PCT/EP2004/010603

§ 371 (c)(1),
(2), (4) Date: Mar. 23, 2006

(87) PCT Pub. No.: WO2005/030427

PCT Pub. Date: Apr. 7, 2005

(65) Prior Publication Data

US 2007/0062916 A1    Mar. 22, 2007

(30) Foreign Application Priority Data

Sep. 24, 2003    (DE) .............................. 103 44 526

(51) Int. Cl.
*B23K 26/10* (2006.01)
(52) U.S. Cl. ..................... 219/121.78; 219/121.61; 219/121.64; 219/121.72; 219/121.81
(58) Field of Classification Search ............ 219/121.63, 219/121.64, 121.74, 121.78, 121.62, 121.79, 219/121.8, 121.81, 121.67, 121.72
See application file for complete search history.

(56) References Cited

U.S. PATENT DOCUMENTS

| | | | | |
|---|---|---|---|---|
| 4,626,999 A | * | 12/1986 | Bannister | 219/121.78 |
| 4,731,254 A | * | 3/1988 | Heineken et al. | 219/121.64 |
| 4,941,739 A | * | 7/1990 | Grudic et al. | 359/223 |
| 6,153,853 A | * | 11/2000 | Maruyama et al. | 219/121.63 |
| 2002/0104834 A1 | * | 8/2002 | Mangiarino et al. | 219/121.78 |
| 2002/0170889 A1 | * | 11/2002 | Faitel | 219/121.63 |
| 2004/0206735 A1 | * | 10/2004 | Okuda et al. | 219/121.78 |
| 2006/0163221 A1 | * | 7/2006 | Makase et al. | 219/121.64 |
| 2007/0062919 A1 | * | 3/2007 | Hamada et al. | 219/121.73 |

FOREIGN PATENT DOCUMENTS

| | | | |
|---|---|---|---|
| DE | 4335367 | | 4/1994 |
| DE | 4424492 A | * | 1/1996 |
| DE | 19750156 A1 | * | 5/1999 |
| DE | 10038309 | | 2/2002 |
| EP | 1228835 | | 8/2002 |
| FR | 2663583 | | 12/1991 |
| JP | 63-108979 A | * | 5/1988 |

(Continued)

*Primary Examiner*—Geoffrey S Evans
(74) *Attorney, Agent, or Firm*—McGlew and Tuttle, P.C.

(57) ABSTRACT

A method for laser beam machining, in particular laser beam welding of bodywork components (14), with the aid of a remote laser head (3). The laser head is guided by a robot (5) including a multi-axial robot hand (7). During the welding process, the emitted laser beam (12) is guided along the welding path (19) on the component (14) by orientation modifications and with a variable irradiation angle beta. said orientation modifications only being produced by pivoting displacements (7) of the manipulator hand (7) about at least one of its hand axes IV, V, VI.

20 Claims, 3 Drawing Sheets

FOREIGN PATENT DOCUMENTS

| | | | | |
|---|---|---|---|---|
| JP | 1-197092 | A | * | 8/1989 |
| JP | 4-319090 | A | * | 11/1992 |
| JP | 5-138374 | A | * | 6/1993 |
| JP | 6-170565 | A | * | 6/1994 |
| JP | 8-315789 | A | * | 11/1996 |
| JP | 9-192869 | A | * | 7/1997 |
| JP | 10-58179 | A | * | 3/1998 |
| JP | 2000-158174 | A | * | 6/2000 |
| JP | 2003-88987 | A | * | 3/2003 |
| WO | WO-2004020140 | A1 | * | 3/2004 |

* cited by examiner

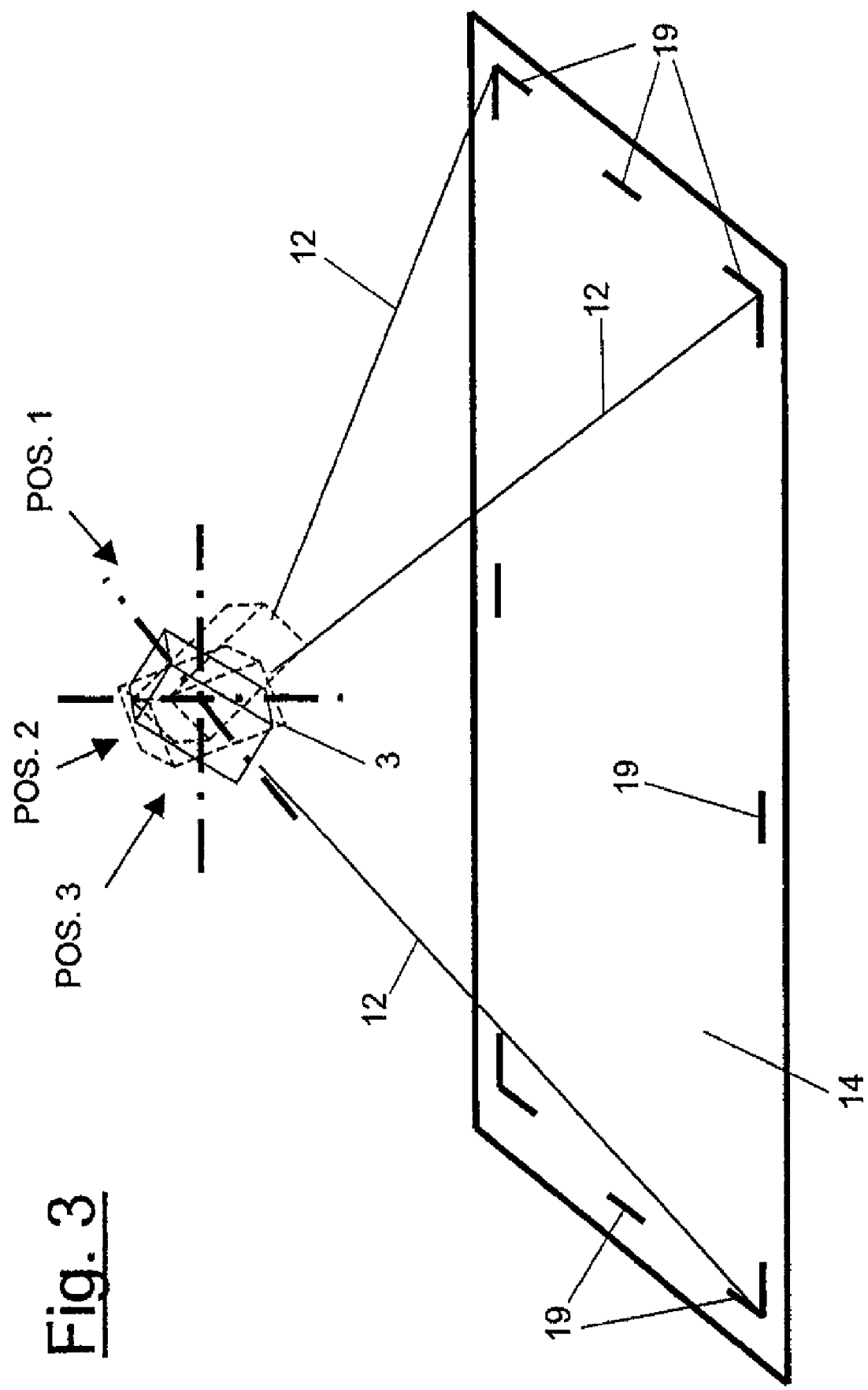

PROCESS FOR THE LASER BEAM MACHINING, ESPECIALLY LASER BEAM WELDING, OF COMPONENTS

CROSS REFERENCE TO RELATED APPLICATIONS

This application is a United States National Phase application of International Application PCT/EP2004/010603 filed Sep. 22, 2004 and claims the benefit of priority under 35 U.S.C. §119 of German Patent Application DE 103 44 526.9 filed Sep. 24, 2003, the entire contents of which are incorporated herein by reference.

FIELD OF THE INVENTION

The present invention pertains to a process for the laser beam machining, especially laser beam welding and cutting, of components, especially body parts.

BACKGROUND OF THE INVENTION

It is known from practice that for laser beam welding, a remote laser head is guided along the path to be welded by means of a multiaxial manipulator, without touching the component. The manipulator has a plurality of basic axes and a hand with a plurality of hand axes. The irradiation angle β on the component is maintained extensively constant. This is achieved by a simultaneous and superimposing motion of all manipulator axes, the bulky basic axes being involved to a great extent. The circumstance that the robot must perform short, choppy motions during the welding of short seam sections due to the high velocities that are necessary because of the cycle time is problematic here. This brings the robot to the limit of a mechanical overload. In addition, the welding velocities that are potentially possible with the laser beam process frequently cannot be fully utilized, which may lead to loss of cycle time and to corresponding problems related to time and plant engineering.

Furthermore, it is known from practice that it is possible to work with remote laser heads, which have an integrated scanner optical system with a plurality of movable mirrors for deflecting the laser beam. The scanner optical systems are, however, relatively expensive and require an additional design and control effort.

SUMMARY OF THE INVENTION

The object of the present invention is to improve the laser beam welding technique.

According toe the invention, a process is provided for laser beam machining, especially laser beam welding, of components, especially body parts. The process comprises providing a remote laser head and guiding the laser head with a manipulator with a multiaxial manipulator hand. During welding, the emitted laser beam is guided along a welding path on the component by orientation modifications and with a variable irradiation angle β, where the changes in the orientation of the laser beam are generated only by pivoting motions of the manipulator hand about at least one of the hand axes thereof.

The process according to the present invention has the advantage that it can be carried out with conventional manipulators and laser heads. The laser head mounted externally on the manipulator hand can be replaced, if necessary, with another tool. A laser head can be used, on the other hand, in conjunction with different manipulators.

The laser beam is moved due to changes in orientation and changes in its deflection angle α along the welding path to be followed. This can happen only due to the motion of the preferably three or more hand axes of the manipulator. The other manipulator axes or basic axes may be at rest during the welding process or bring about at best a height equalization in the direction of the laser beam by adjusting the manipulator hand.

The guiding of the laser beam by a simple motion of the hand axis has control engineering and economic advantages. On the one hand, existing axes of the manipulator and especially of the robot can be used, and auxiliary axes at or in the laser head are dispensable. This relieves the burden on and simplifies the robot control. The programming effort is substantially reduced as well. An existing manipulator or robot of the standard design can be used as it is. A special adaptation of the device is not necessary, with the exception of a possible extension arm. Furthermore, the elimination of auxiliary axes for deflecting the laser beam simplifies the laser head and makes it less expensive.

The laser beam can be moved very rapidly and with precision due to the pivoting motions of the manipulator hand. It is also unnecessary to move heavy weights during the motions of the hand. In addition, it is possible to work with conventional and inexpensive remote laser beam heads with rigid-angle optical systems and fixed focal length.

The process according to the present invention offers various advantages. On the one hand, the maximum possible welding velocity can be reached and extensively maintained at the component due to the rapid motions of the laser beam per change in orientation. More weld seams can be produced with the process being claimed during the same cycle time than with the conventional laser beam welding technique. This makes it possible, on the one hand, to shorten the cycle time if this is desirable. On the other hand, better utilization of the cycle time can lead to considerable technical and economic savings. Due to the better utilization, fewer laser welding means, especially welding robots, are sufficient for preparing an equal number of weld seams on one or more components, e.g., on a vehicle body. This, on the other hand, simplifies the systems and plant engineering and makes it less expensive. This leads to a lasting relief of the load especially in the area of framing and geo stations and deposit welding stations in body framing and paneling. Corresponding advantages arise in other laser machining operations with a manipulator or robot, e.g., during laser cutting.

The manipulator used may have any desired and suitable design and represent a stationary frame with a multiaxial manipulator hand in the simplest case. In the preferred embodiment, the manipulator has one or more translatory and/or rotatory axes. In particular, the manipulator with its hand is advantageously designed as a multiaxial industrial robot, especially as an articulated arm robot with six or more axes. Such articulated arm robots are used in large numbers in industry, especially in body manufacturing.

The robot hand preferably has three hand axes IV, V, VI here, which intersect at an intersection. This makes possible the motion of a laser beam directed preferably at right angles to the last hand axis VI in a shell path around the intersection. When the emitted laser beam of a remote laser head, which is preferably attached externally to the robot hand, also intersects the intersection, the focus of the laser beam is moving on a calotte shell around this intersection. This makes possible the especially simple, rapid and precise motion of the laser beam.

Depending on the change in orientation or the deflection angle α and the corresponding length of the weld seam, deviations in height of the focus in relation to the component may occur. When remote laser heads with long focal length of, e.g., 500 mm to 1,500 mm are used, this deviation in height may be within the tolerance range and acceptable. If higher precisions are required, adjustment of the focus may also take place during the welding operation, which is possible in different ways, e.g., by displacing the focusing optical system or by an adjusting motion of the manipulator or robot in the direction of the beam.

The remote laser head may be attached directly to the robot hand. However, the insertion of an extension arm is favorable in many cases. The extension arm increases the "lever arm" of the laser beam or the distance between the intersection of the hand axes and the component. The greater this distance or the focal length of the laser head, the broader is the working range and the seam length that can be obtained while maintaining acceptable irradiation angles β. Furthermore, an extension arm makes it possible to use remote laser heads with shorter focal length while the working ranges are nevertheless broad.

It is advantageous in the process according to the present invention to adjust the laser output as a function of the changes in orientation or irradiation angles β of the laser beam during welding. The laser welding process can be optimized as a result.

Any desired seam forms (butt welds, lap welds, fillet welds, etc.) can be welded by means of laser beam with the technology according to the present invention. The weld seams may be formed as continuous, longer weld seams or as shorter weld seam sections, e.g., in the form of a stitch seam. Due to the broad working range of the laser welding device, the displacing motions between the weld seams or seam sections can also be performed by a motion of the hand with the manipulator not moving. When the working range is exceeded, the displacing motion can be supported or brought about by motion of the manipulator.

The present invention is schematically shown as an example in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a simplified schematic view of a welding process with a plurality of weld seams on a component.

DESCRIPTION OF THE PREFERRED EMBODIMENTS

Figure 1:
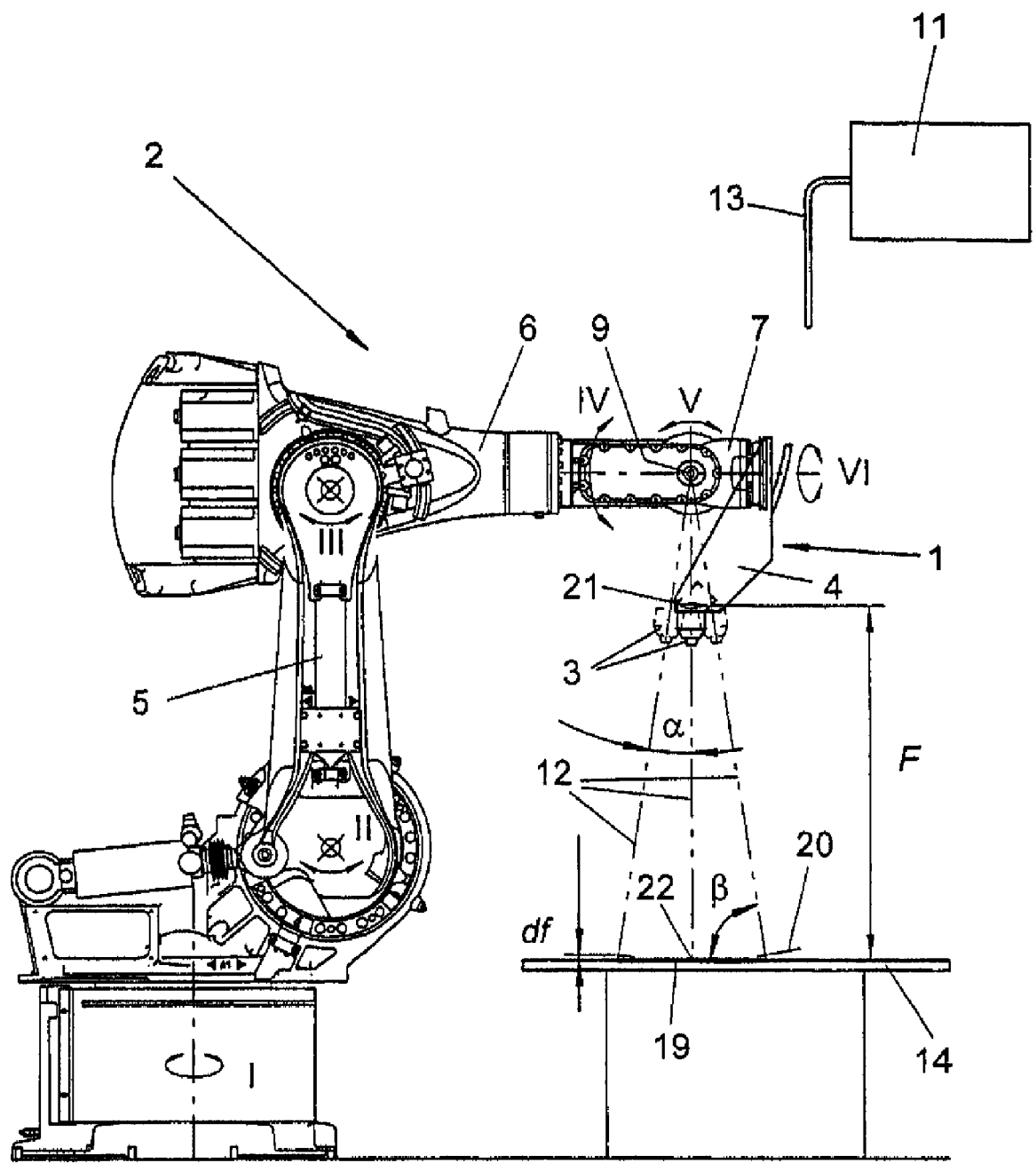
FIG. 1 is a side view of a laser welding station with a robot-guided laser welding device and a component.

Referring to the drawings in particular, the present invention pertains to a process for laser machining, especially laser beam welding, of components (14), which may be of any number, type and size. In the preferred embodiment, they are body parts of vehicles and optionally also complete body shells.

The present invention pertains, furthermore, to a laser welding device (1) or a laser welding station (2) equipped therewith for joining components (14) by means of laser beam welding. It may be, e.g., a geo station or framing station within a manufacturing plant for manufacturing body shells, in which body parts, e.g., a floor part or side panels, etc., are brought into the geometrically correct position in relation to one another, are clamped in this position and joined by means of one or more laser weld seams (19). The laser welding station (2) may be, in addition, a component preparation station, in which, e.g., a side panel group is built up consecutively from a plurality of individual parts and joined by laser beam welding. The other components of the laser welding station (2) are not shown for clarity's sake. The laser welding station may also have two or more of the laser welding devices (1) described in greater detail below.

The laser welding device (1) shown in FIG. 1 comprises a manipulator (5) with a multiaxial manipulator hand (7) and with a remote laser head (3), which emits a laser beam (12). The present invention thus also pertains to the operation of such a manipulator (5) for carrying out a laser machining process.

The manipulator (5) holds the laser head (3) at a spaced location from and without contact with the component (14), which is shown in FIG. 1 in a simplified manner as a metal sheet on a component support. The component (14) may otherwise have any desired shape and size.

The manipulator (5) is designed in the preferred exemplary embodiment as a multiaxial industrial robot, especially as a six-axis articulated arm robot. It comprises a stationary base or optionally a base provided with an additional travel axis, on which a carrousel is mounted rotatably about a vertical robot axis I. A rocker is mounted pivotably about a second horizontal robot axis II on the carrousel. At the other end, the rocker carries a robot arm (6), which is mounted pivotably about a third horizontal robot axis III. These robot axes I, II, III form the so-called basic axes.

The manipulator hand or robot hand (7) preferably has at least two, especially three or more hand axes IV, V, VI, which preferably all intersect in a common intersection (9). The robot hand (7) with its housing (10) is mounted rotatably about the first hand axis IV on the robot arm (6). The drive is via a drive flange (8) of the robot hand (7), which can rotate about the last hand axis VI. The drive flange (8) is in turn mounted pivotably in the hand housing (10) about the hand axis V extending transversely.

The remote laser head (3) is preferably arranged externally on the manipulator (5) and is attached to the drive flange (8) directly or via the intermediary of an extension arm (4). The laser head (3) has a preferably rigid-angle focusing optical system (21) without scanner mirror or the like, which focuses the laser beam received from a laser beam source (11) with, e.g., constant focal length F and emits same to the component (14). The focal length F is, e.g., 500 mm to 1,500 mm and preferably 1,000 mm to 1,500 mm, but it is possible to deviate from this focal length range upward or downward depending on the application.

As an alternative, the laser and focusing optical system (21) may have a variable focal length, which can be achieved, e.g., by changing the optical system, a rotatable revolver head with a plurality of optical systems, an optical system adjustable in the manner of a zoom lens, a connection-side change of collimation, or the like.

The laser beam source (11) may be of any desired type and size. In the preferred exemplary embodiment, it is a fiber laser or a disk laser with, e.g., an external laser beam source (11), which is connected to the laser head (3) via any desired and suitable laser beam guide (13), e.g., a flexible optical fiber cable, a tube/mirror array or the like. The laser beam source (11) may emit a single laser beam (2) or a plurality of laser beams (2) and may be designed, e.g., as a multiline laser which can be controlled in terms of the output and the geometry of the beam. The laser head (3) is preferably attached to the robot hand (7) such that the laser beam (12) emitted to the component (14) is not aligned with the last hand axis VI and is directed especially at right angles thereto. The laser head (3) is preferably in a position that is set back from the drive flange (8) and in which the active axis of the emitted laser beam (12) intersects the intersection (9) of the hand axes IV, V, VI.

Figure 2:
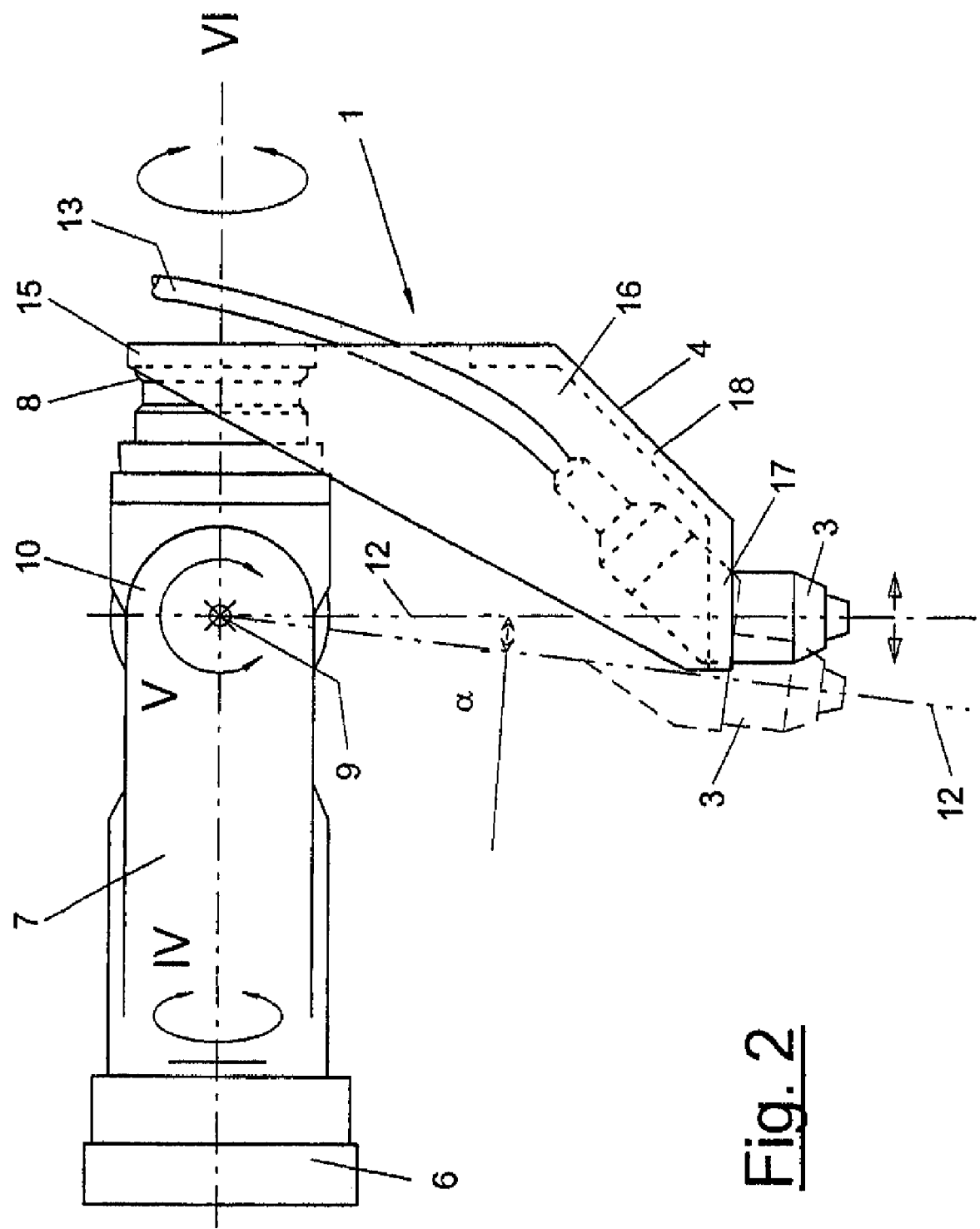
FIG. 2 is an enlarged view of the robot hand with an extension arm and a remote laser head.

The extension arm (4) has a mounting plate (15) for fastening on the drive flange (8). It has, furthermore, a bracket (17) for the laser head (3), which is directed transversely and at right angles to the mounting plate (15). The mounting plate (15) and the bracket (17) are located at the opposite ends of the extension arm (4) and are connected to one another by at least one spacing side arm (16). The side arm (16) has a correspondingly cut shape with end edges, which extend transversely to one another and in the area of which the mounting plate (15) and the bracket (17) are attached. FIG. 2 shows this design in detail.

The extension arm (4) is preferably designed as a frame-like housing and has at least two side arms (16). In the preferred embodiment, these side arms are arranged in parallel to one another and at such spaced locations from one another that they laterally surround the hand (7) and the laser head (3) at least in some areas. In addition, the side arms (16) are connected to one another by one or more transversely located intermediate plates (18). These are indicated by broken lines in FIG. 2. The extension arm (4) or the side arm (16) or the side arms extends/extend, starting from the mounting plate (15), obliquely rearwardly against the last hand axis VI. As a result, the laser head (3) is arranged offset rearwardly from the drive flange (8) in the above-mentioned manner. Due to this axially symmetrical arrangement, the motions of the laser head (3) can be controlled via the motions of the hand axes directly and without taking offset errors into account. The motions of the hand axes are controlled in the usual manner by the robot control.

During welding, the emitted laser beam (12) is guided along the welding path (19) to be followed due to changes in orientation, and these changes in orientation are generated only by pivoting motions of the robot hand (7) about one or more of their hand axes IV, V, VI. The changes in orientation are changes in the angle of the laser beam (12) by variable deflection angles α about the participating hand axes IV, V, VI, and especially about the intersection (9) between the hand axes and the laser beam (12). The deflection angle α is, e.g., the pivot angle of the laser beam (12) in relation to the normal direction to the component (14). The laser beam (12) is preferably guided here exclusively by rotary motions about the intersection (9) along the welding path (19) to be followed on the component (14). The focus (22) of the laser beam (12) is moving now on a shell surface (20), preferably a calotte shell surface, about the intersection (9). When the laser head (3) is arranged with a lateral offset in relation to the intersection (9), so that the emitted laser beam (12), which is extended in the rearward direction, does not intersect the intersection (9), another shell path (20) is obtained for the focus (22).

The laser head (3) itself preferably has no mechanical auxiliary axes of its own for following the path or weld, aside from a possible focal length adjustment, and does not need to be driven in this respect.

Due to the changes in orientation and the variable deflection angles α, the irradiation angles β of the laser beam (12) also change at the component (14). The range of irradiation angles permissible for laser welding processes can vary correspondingly to the design of the laser and the components. The irradiation angles β that are suitable for the process are approx. 60° or greater with the laser welding techniques commonly used so far.

Due to the shell-shaped focus path (20), there will be deviations in height, df, between the focus (22) and the component (14), which increase with increasing deflection angle α. These deviations in height, df, are tolerable in case of longer focal length F, especially in the preferred range between 1,000 mm and 1,500 mm, and in many cases do not need to be compensated. Adjustment of the focus may be carried out for compensation in many cases. This can be carried out in different ways, e.g., by a linear axis integrated in the laser head (3), with which the focusing optical system (21) can be moved forward and backward in the direction of the beam. Another possible internal focus adjustment is a special adaptive focusing optical system (21) with variable focal length. Furthermore, it is possible to carry out the height deviation df by an adjusting motion of the robot (5) via the basic axes I, II, III. The setting values necessary for setting the focus adjustment can be obtained in a desired and suitable manner, e.g., by measuring the distance between the laser head (3) and the component (14) or by measuring the deflection angle α and recalculating the height deviation df arising herefrom.

During welding, the manipulator or the robot (5), preferably with its basic axes I, II, III, is at rest and positions only the robot hand (7) at the desired location in space at a spaced location from the component (14). The motion of the laser beam is then carried out only by the rotation or pivoting of one or more hand axes IV, V, VI. An offsetting motion of the robot (5) and of the robot hand (7) does not preferably take place. However, the focus can be adjusted in the above-mentioned manner via the basic axes I, II, III.

Different types of weld seams (19) can be welded on the component (14) with the technology described. FIG. 3 shows an exemplary embodiment for this with a plurality of line seams, which are partly essentially straight and, on the other hand, markedly curved and especially bent at an angle. FIG. 3 also shows the different angular positions or positions 1-3 of the remote laser head (3), from which the laser beam (12) is directed toward the desired positions on the component (14).

If the focal length F and/or the length of the extension arm as well as the working range resulting herefrom are sufficiently great, the entire component (14) can be welded from one position in space of the robot hand (7) by pure motions of the hand axes. As in FIG. 3, the offsetting motion of the laser beam (12) also takes place by a pure, hand axis-controlled rotary motion of the laser head (3). As an alternative, the offsetting motion between the individual weld seams (19) or seam sections can take place by repositioning the robot hand (7) by the manipulator (5). Furthermore, it is possible in a kinematic reversal to move the component (14) during the offsetting motion in relation to the laser head (3). No welding takes place during the offsetting motions.

The output of the laser beam source (11) can be adjusted during the welding process as a function of the changes in orientation and the variable irradiation angles β of the laser beam (12). In addition, adjustment of the output may also take place for infeed at the beginning of the weld seam and for extending at the end of the weld seam. Losses of power at the site of the seam, which may develop, e.g., due to unfavorable, flatter irradiation angles β, can be compensated by the angle-dependent output adjustment. In case of the correct irradiation angle β between the laser beam (12) and the component (14) at the point at which the beam reaches the component, the radiant power that can be transmitted has its maximum, so that the laser output can be correspondingly reduced here. As an alternative to adjusting the output, the velocity of welding can be changed in order to reach the desired energy for the section.

Various modifications of the embodiment being shown are possible. This applies, on the one hand, to the design of the manipulator (5). This may have any other desired design and have another number, type, arrangement and/or combination of basic manipulator axes I, II, III. In particular, the manipulator may have translatory or rotatory axes or any combination of these types of axes as desired. The manipulator may be designed, e.g., as a portal robot with three translatory travel axes (e.g., cross slide with a lifting unit). The manipulator (5) may also be a stationary frame or the like in case of a sufficiently large working range of the laser welding device (1). The manipulator (5) may, furthermore, be designed in any desired manner, e.g., upright on the floor or hanging on a portal or on a wall. Furthermore, other types of kinematics of the manipulator hand (7) and manipulator hand axes are possible as well. The extension arm (3) may be eliminated in favor of direct mounting of the remote laser head (3) on the drive flange (8). The offset arising herefrom in relation to the intersection (9) is correspondingly compensated in a hand axis control and may also be advantageous for certain applications, especially when welding is to be performed in space around edges on the component.

Furthermore, the construction of the laser per se is variable as well. This applies, on the one hand, to the design of the remote laser head (3) and the focusing means (21) thereof. On the other hand, the laser beam source (11) may be integrated in the laser head (3) or at another location, e.g., at the robot arm (6). Furthermore, it may be designed as a diode laser, a $CO_2$ laser or any other type of laser as desired. The type of the laser beam guiding (13) is also variable. It may be designed, e.g., as an open or closed mirror guide with mobile tube sections. Furthermore, it is possible to use the technique being described for other laser machining methods, e.g., laser cutting, surface machining with laser, etc.

While specific embodiments of the invention have been shown and described in detail to illustrate the application of the principles of the invention, it will be understood that the invention may be embodied otherwise without departing from such principles.

The invention claimed is:

1. A process for the laser beam machining of components, the process comprising:
providing a remote laser head;
guiding the laser head with a manipulator with a multiaxial manipulator hand, said remote laser head being arranged externally on said manipulator hand, said laser head emitting a laser beam;
during welding or cutting, guiding the emitted laser beam along a welding or cutting path on the component by orientation modifications and with a variable irradiation angle β, the guiding including changing the orientation of the laser beam only by pivoting motions of the manipulator hand about at least one of the hand axes resulting in a changing of irradiation angle of the laser beam; and
changing and adjusting at least one or more of a laser power output of the emitted laser beam and a velocity of welding or cutting as a function of the changing irradiation angle β of the laser beam.

2. A process in accordance with claim 1, wherein the laser beam emitted to the component is not aligned with a last hand axis.

3. A process in accordance with claim 2, wherein the manipulator is at rest during machining, welding or cutting with three other axes.

4. A process in accordance with claim 2, wherein the remote laser head is held with an orientation in which the emitted laser beam is directed at right angles to the last hand axis.

5. A process in accordance with claim 1, wherein the focus of the laser beam is adjusted in the direction of the beam during welding or cutting.

6. A process in accordance with claim 1, wherein the focus of the laser beam is moved during welding or cutting on a shell path about an intersection of several of the hand axes.

7. A process in accordance with claim 1, wherein the remote laser head is guided by means of an extension arm at a spaced location from the manipulator hand.

8. A process in accordance with claim 1, wherein a remote laser head with an optical system adjustable in the manner of a zoom lens is used.

9. A process in accordance with claim 1, wherein the remote laser head is attached directly to the manipulator hand such that the emitted laser beam intersects the intersection of the several of the hand axes.

10. A process in accordance with claim 1, wherein a remote laser head with a fixed-angle focusing optical system is used.

11. A process in accordance with claim 1, wherein said remote laser head has a fixed focal length of preferably 500 mm to 1,500 mm.

12. A process for the laser beam welding of vehicle body parts, the process comprising:
providing a manipulator with robot basic axes and a manipulator hand having hand axes;
providing a laser source;
providing a remote laser head, said remote laser head being connected to said manipulator hand such that said remote laser head is located at a spaced location from said manipulator hand;
providing a fiber optic cable;
connecting said laser source to said remote laser head via said fiber optic cable;
guiding the laser head with the manipulator hand;
during welding guiding the motion of the hand to move the laser beam along a welding path on the vehicle body part by orientation modifications and with a variable irradiation angle β, wherein the changes in the orientation of the laser beam are generated only by pivoting motions of the manipulator hand about at least one of the hand axes;
changing at least one of laser power and velocity of welding as function of said variable irradiation angle β.

13. A process in accordance with claim 12, wherein the focus of the laser beam is moved during welding on a shell path about an intersection of several of the hand axes.

14. A process in accordance with claim 12, wherein the focus of the laser beam is adjusted in the direction of the beam during welding.

15. A process in accordance with claim 12, further comprising guiding the remote laser head using an extension arm at a spaced location from the manipulator hand.

16. A process in accordance with claim 12, wherein the laser beam emitted to the part is not aligned with a last hand axis of the hand axes.

17. A process in accordance with claim 16, wherein the manipulator is at rest during welding with there being no movement about the robot basic axes during welding.

18. A device for the laser beam welding of vehicle body parts, the device comprising:

a manipulator with robot basic axes and a manipulator hand having hand axes;

a remote laser head arranged externally to said manipulator hand, said remote laser head emitting a laser beam;

a control means for pivoting said manipulator hand about at least one of said hand axes such that the laser beam is guided along a welding path on the vehicle body with a variable irradiation angle $\beta$;

a laser beam source arranged in a position external to said manipulator; and a fiber optic cable, said laser head being connected to said laser beam source via said fiber optic cable.

19. A device in accordance with claim 18, wherein one or more of laser power and a velocity of welding is adjusted as a function of the irradiation angle $\beta$ of the laser beam via said control means.

20. A device in accordance with claim 18, wherein said remote laser head has a fixed focal length of 500 mm to 1,500 mm.

* * * * *